UNITED STATES PATENT OFFICE.

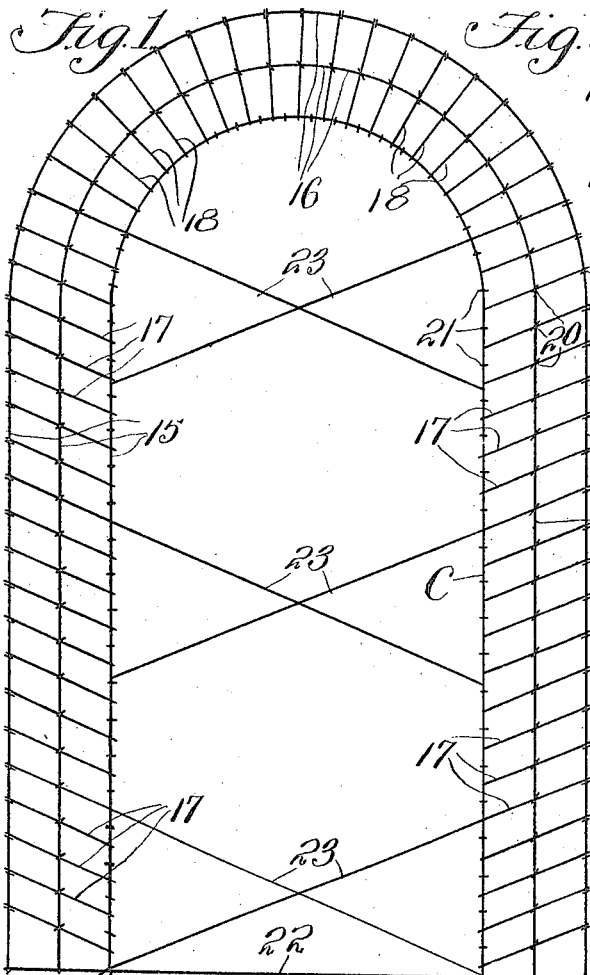
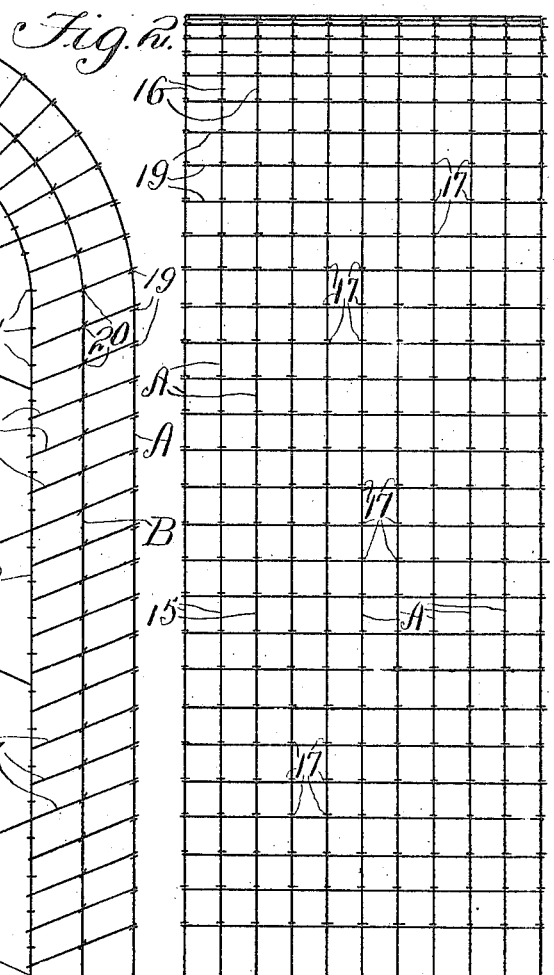
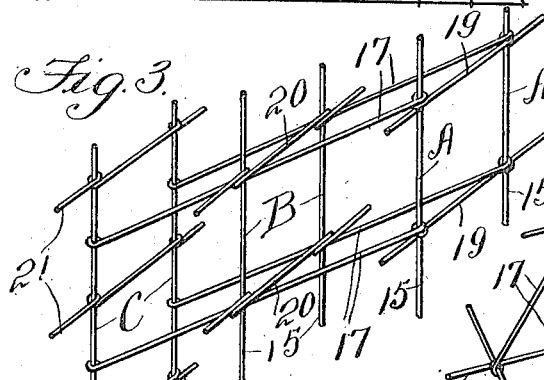
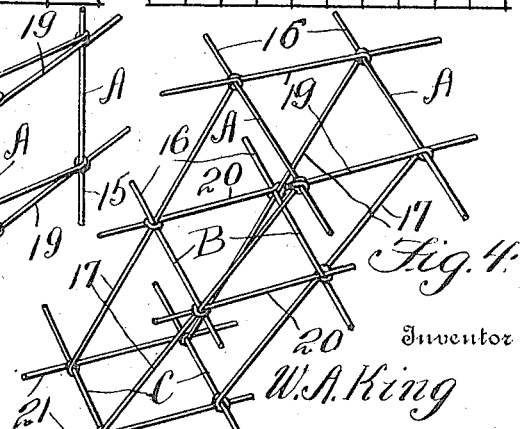

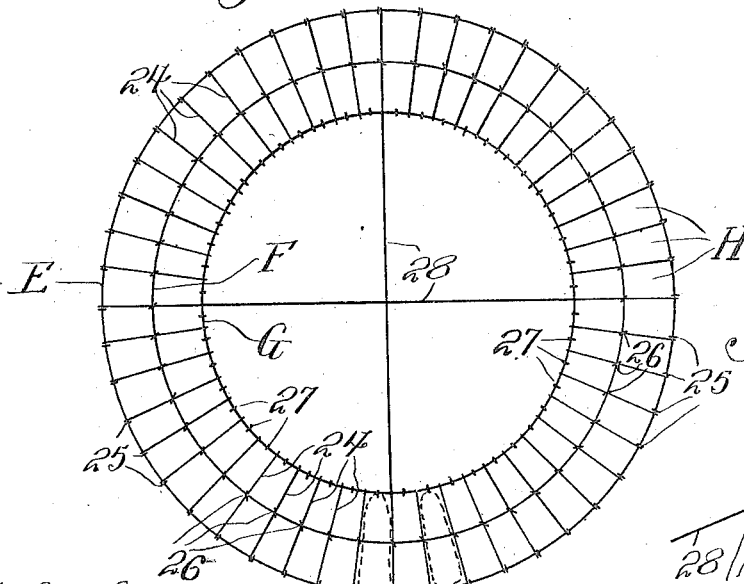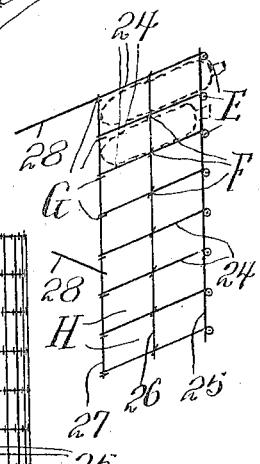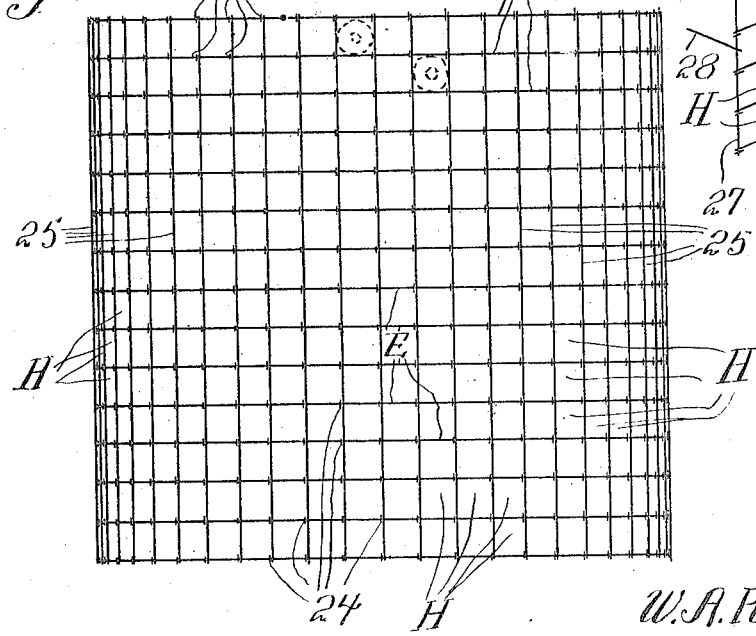

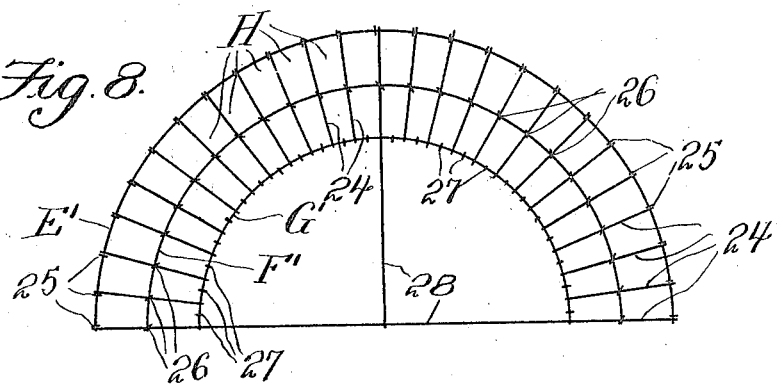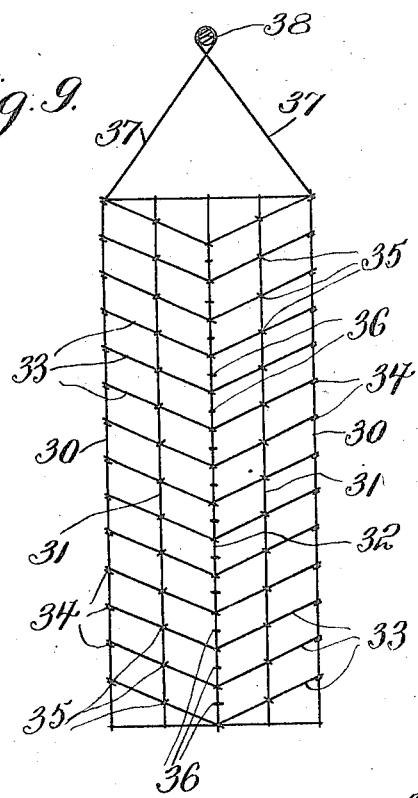

WILLIAM A. KING, OF PIERRE, SOUTH DAKOTA.

SEED-CORN DRIER.

1,236,318.  Specification of Letters Patent.  Patented Aug. 7, 1917.

Application filed July 28, 1916. Serial No. 111,888.

*To all whom it may concern:*

Be it known that I, WILLIAM A. KING, a citizen of the United States, residing at Pierre, in the county of Hughes and State of South Dakota, have invented new and useful Improvements in Seed-Corn Driers, of which the following is a specification.

This invention relates to an improved seed corn drier and holder.

In preserving seed corn it is important that the ears shall be thoroughly exposed to the circulation of air in order that the seed may be properly dried and seasoned. The present invention has for its object to produce a simple, improved and inexpensive holder in which the ears may be stored, the same consisting of a wire structure having wheels or compartments of proper size to receive the individual ears of corn which may be safely stored therein until wanted, and in which each separate ear will be readily accessible.

A further object of the invention is to produce a wire structure having cells or compartments for individual ears of corn, the said compartments being so arranged that the corn will be safely supported against endwise sliding, as well as against rolling movement.

A further object of the invention is to produce a wire structure having cells or compartments which are sloped downwardly and inwardly to prevent individual ears of corn stored in said compartments from sliding outward.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is an end view illustrating one form of the improved device.

Fig. 2 is a side view of the same.

Fig. 3 is a perspective detail view of a single complete compartment and parts of adjacent compartments, said compartments being taken from one of the sides of the structure.

Fig. 4 is a similar view of a compartment taken from the top of the structure.

Fig. 5 is a top plan view illustrating a modified form of the invention.

Fig. 6 is a side elevation showing a portion of the same.

Fig. 7 is a sectional detail view taken on the line 7—7 in Fig. 5.

Fig. 8 is a top plan view of a further modified form.

Fig. 9 is an end view showing a further modification.

Corresponding parts in the several figures are denoted by like characters of reference.

In Figs. 1 and 2 there is shown a wire structure containing outer arch members A, intermediate arch members B and inner arch members C, all made of wire sufficiently large and stiff. It will, of course, be understood that the wires employed in the manufacture of this device may be of different gage to produce the best results. Each arch member is composed of straight vertical limbs 15 and an arcuate crown piece 16, the crown piece of the outer arch being of greater radius than that of the middle arch which in turn is of a radius exceeding that of the inner arch. The limbs of the several arches may be of substantially the same length. The limbs of the outer, middle and inner arches are connected together by downwardly and inwardly inclined wires 17, and the crowns of the outer, middle and inner arches are likewise connected by wires 18 which are radially disposed with respect to said crowns. A frame composed of three arches A, B and C with the connecting wires 17 and 18 may be regarded as composing a unit, any desired number of which may be used in the complete structure.

Any desired number of these units to form a structure of the desired dimensions are connected together by longitudinal tie wires 19, 20 and 21. The wires 19 are joined to the units at the intersection of the wires 17 and 18 with the outer arch member A. The wires 20 are joined with the wires 19 and 18 at the intersection thereof with the middle arch B. The wires 21 are joined with the inner arches of the respective units at points intermediate the junctures of the wires 17 and 18 with the limbs and crown of said inner arch members. A structure will thus be formed having numerous cells or compartments D, each of which is bounded by four corner wires 17 or 18, together with portions of the arch wires A, B and C and the longitudinal wire stringers 19, 20 and 21; the last mentioned wires, 21, extending across the respective compartments at the inner ends thereof to preclude the possibility of an ear of corn dropping lengthwise in an inward direction through any of the compartments. The stringer wires 21 have been omitted from the portions of the corners of the respective arches. This is because the cells or compartments of the crown are tapered inwardly, as will be clearly seen in Fig. 4, this inward taper being deemed sufficient to retain the ears of corn in position. The stringer wires 21 may, however, be used throughout the structure, if desired.

The lower ends of the limbs of the arch members A, B and C of some of the units may be connected together by cross braces 22, as clearly seen in Fig. 1. In some of the units diagonal braces 23 may also be provided at proper intervals, said diagonal braces being formed, if desired, by extensions of some of the wires 17 and 18.

In Figs. 5 and 6 there has been shown a wire structure of modified form, the structure being in this instance of cylindrical shape. In this form of the invention there are employed outer rings E, middle rings F and inner rings G, each made of wire and of circular form, and the several rings being of different radius and concentrically disposed, said rings being connected together by radial wires 24 which are inclined downwardly and inwardly, the outer ring E being disposed above the plane of the middle ring F and the latter above the plane in which the inner ring G is disposed. Any desired number of units formed of the rings E, F and G and the radial wires 24 are connected together by vertical wires 25 connected with the units at the intersection of the middle rings F and the radial wires 24, and still other vertical wires 27 may be connected with the inner ring G of the several units intermediate the points at which said inner rings are connected with the radial wires 24. A structure will thus be formed having a large number of pockets or compartments H which are sloped downwardly, tapered inwardly and obstructed at their inner ends by the wires 27, which latter, however, may be omitted, if desired. The structure may be reinforced by radial brace wires 28.

In Fig. 8 there is shown a top plan of the structure, the construction of which resembles that of the device illustrated in Fig. 5 bisected vertically, the rings E, F and G being replaced by semi-circular wires E', F' and G'. In other respects the construction is the same, and the same numerals have been used to designate the parts thereof. The device seen in Fig. 8 may be conveniently set up against a wall. By vertically bisecting the device illustrated in Fig. 8 a structure may be produced which will fit snugly in the corner of a room, as will be readily understood.

In Fig. 9 there has been illustrated a further modification of the device in which two outer wires 30, two intermediate wires 31 and a center wire 32 are connected together by wires 33 that slope from the outer wires 30 downwardly in the direction of the center wire 32, producing a unit, any desired number of which, may be connected together by horizontal stringer wires 34, 35 and 36, producing a structure which greatly resembles that shown in Figs. 1 and 2, except that the crown is omitted, and the side wall portions are brought closely together. In this structure it will be seen that the individual compartments or pockets are sloped inwardly to support ears of corn placed therein. This structure is also shown as being provided with gable wires 37 connecting the upper extremities of the vertical wires 30 with a ridge beam 38, whereby the entire structure may be suspended above the floor level when desired.

It will be understood that the various forms of the device herein shown and described are merely illustrative of the principle of the invention which consists in the formation of a wire structure so constituted as to form a large number of pockets or compartments, each adapted to receive a single ear of corn which is placed endwise therein, the pockets or compartments being sloped downwardly and inwardly so as to retain the ear of corn very securely and yet in such a manner that each individual ear will be conveniently accessible. The ears of corn placed in the compartments may easily be tagged or marked to designate its kind. The holders or structures may be made of any desired dimensions and capacity. Holders constructed as seen in Figs. 1, 2 and 9 may be placed end to end in order to provide the desired capacity. Structures of the forms illustrated in Figs. 1, 2 and 5 provide for thorough ventilation between the stacks or rows of ears, but in all of the structures the ears will be exposed in such a manner that thorough ventilation will be provided therebetween, causing the seed to be thoroughly dried and seasoned. The improved structures may be manufactured at a very moderate expense, and they provide for the saving of seed corn in a safe and sanitary manner. The vertical wires in each of the several forms of the device may be extended downwardly to provide supporting elements of proper length to prevent rats, mice and other vermin from reaching the corn.

Having thus described the invention, what is claimed as new, is:—

1. A seed corn drier consisting of a wire structure having a plurality of divergent pockets or compartments, each of which is bounded by four corner wires and by horizontal and vertical wires intersecting said corner wires and connected therewith.

2. A seed corn drier consisting of a wire structure having a plurality of divergent pockets or compartments, each of which is bounded by four corner wires and by horizontal and vertical wires intersecting said corner wires and connected therewith, said compartments being sloped downwardly from their outer ends.

3. A seed corn drier consisting of a wire structure having a plurality of divergent pockets or compartments, each of which is bounded by four corner wires and by horizontal and vertical wires intersecting said corner wires and connected therewith, said compartments being sloped downwardly from their outer ends, and said compartments being obstructed at their inner ends by transversely disposed wires.

4. A seed corn drier consisting of a wire structure having a plurality of pockets or compartments for the reception of individual ears of corn, said compartments embodying in their construction corner wires, horizontal connecting wires and vertically disposed supporting wires, said wires being connected together at the points of intersection.

5. A seed corn drier consisting of a wire structure having a plurality of pockets or compartments for the reception of individual ears of corn, said compartments embodying in their construction corner wires, horizontal connecting wires and vertically disposed supporting wires, said wires being connected together at the points of intersection, the compartments being sloped downwardly from their outer ends and transversely obstructed at their inner ends by some of the connecting wires.

6. A seed corn drier consisting of a wire structure comprising a plurality of compartments for the reception of individual ears of corn, each compartment being bounded by corner wires, horizontally disposed connecting wires and vertically disposed supporting wires, some of the vertical supporting wires having upward extensions forming gable wires, and a ridge beam connected therewith.

In testimony whereof I affix my signature.

WILLIAM A. KING.

Copies of this patent may be obtained for five cents each, by addressing the "Commissioner of Patents, Washington, D. C."